3,014,838
INSECTICIDES
Alan R. Stiles and Milton Silverman, Modesto, Calif., assignors to Shell Oil Company, a corporation of Delaware
No Drawing. Filed Jan. 5, 1959, Ser. No. 784,885
16 Claims. (Cl. 167—30)

This invention relates to novel complex nitro-substituted aryl compounds which contain phosphorus and to the employment of these compounds as insecticides. Certain organic phosphorus-containing compounds have become important in recent years because of their potency as insecticides. For example, Stiles, U.S. 2,685,552 (Shell Development Company), describes 2-methoxycarbonyl-1-methylvinyl dimethyl phosphate as an insecticide of outstanding toxicity. In spite of their impressive initial toxicity, many of these phosphorus compounds are effective for only a short time and are consequently rendered less valuable or altogether useless in those situations calling for extended residual toxicity. The need for potent phosphorus-containing insecticides manifesting extended residual toxicity has thus become increasingly manifest. The novel insecticides of the present invention satisfy this urgent need without sacrificing the characteristics potency and other advantages of these known organic phosphorus insecticides. The principal object of the present invention is then to provide organic phosphorus-containing insecticidal compounds evidencing high initial potency, extended residual toxicity, yet which are relatively inexpensive to synthesize and formulate.

Another object of the present invention is to provide insecticidal compositions containing these compounds.

Yet another object of the present invention is to provide a method of combating insects comprising essentially contacting insects with these novel compounds.

Other objects, features and advantages of the present invention will be apparent from the following description read in conjunction with the appended claims.

The new and novel compounds encompassed by the present invention may be represented by the following structural formula::

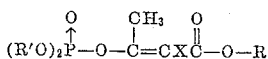

wherein R is a nitro (preferably mononitro) substituted aralkyl or aryl group. When R is an aralkyl group, the alkyl portion may contain 1–5 carbon atoms and is a branched or straight chain. The alkyl portion of the aralkyl group is preferably methyl. The aryl portion of the molecule may be a phenyl or tolyl group. Phenyl is the preferred aryl group and benzyl the preferred aralkyl group. The aryl group in each case is partially or completely substituted with nitro groups. R' is a lower alkyl radical which may contain 1–5 carbon atoms. R' may also represent an aryl radical such as phenyl, naphthyl or tolyl or an aralkyl radical wherein the alkyl portion contains 1–5 carbon atoms. R' is preferably a methyl group. It will be understood that each R' may represent a different alkylaryl or arylalkyl group in the molecule. X is hydrogen or halogen (preferably chlorine). Specific examples of compounds encompassed by the present invention are 2-(p-nitrophenoxycarbonyl)-1-methylvinyl dimethyl phosphate; 2-(o-nitrophenoxycarbonyl)-1-methylvinyl dimethyl phosphate; 2-(m-nitrophenoxycarbonyl)-1-methylvinyl dimethyl phosphate; 2-(2,4-dinitrobenzyloxycarbonyl)-1-methylvinyl dimethyl phosphate; 2-(3,4-dinitrobenzyloxycarbonyl)-1-methylvinyl dimethyl phosphate; 2-(2,4,6-trinitrobenzyloxycarbonyl)-1-methylvinyl dipentyl phosphate; 1-methyl-2-(2,3,4,5,6-pentanitrobenzyloxycarbonyl)vinyl dimethyl phosphate; 2-(p-nitrophenoxycarbonyl)-2-chloro-1-methylvinyl dimethyl phosphate; 2-(o-nitrophenoxycarbonyl)-2-fluoro-1-methylvinyl dimethyl phosphate; 2-(m-nitrophenoxycarbonyl)-2-bromo-1-methylvinyl dimethyl phosphate; 2-(p-nitrophenoxycarbonyl)-2-iodo-1-methylvinyl dimethyl phosphate; 2-(p-nitrophenoxycarbonyl)-1-methylvinyl dibenzyl phosphate and 2-(o-nitrophenoxycarbonyl)-1-methylvinyl diphenyl phosphate.

The novel compounds of the present invention can be prepared by any of the methods known in the art for synthesizing compounds of this general character. If desired, compounds of the present invention may be prepared by reacting the appropriate trialkyl phosphite with the appropriate nitro-substituted arylhaloacetoacetate. The haloacetoacetate may in turn be prepared from the nitro-substituted arylacetoacetate. The acetoacetate itself may be prepared by methods well know in the art, for example, by the reaction of the appropriate nitroaryl alcohol with diketene or by transesterifying the nitroaryl alcohol with an acetoacetate ester. It is also possible to prepare compounds of the present invention by nitration of the corresponding aryl-containing phosphates or by employing the Schrader method. The preparation of the compounds of the present invention are illustrated by the following examples.

EXAMPLE I.—2-(p - NITROBENZYLOXYCARBONYL)-1-METHYLVINYL DIMETHYL PHOSPHATE (a) p-Nitrobenzyl acetoacetate p-Nitrobenzyl alcohol (75.0 g., 0.49 mole) was dissolved in 300 ml. of benzene containing 0.5 g. of p-toluenesulfonic acid. The mixture was stirred and brought to reflux (80° C.) while 41.0 g. (0.49 mole) of diketene was added dropwise during the course of one-half hour. The reaction mixture was stirred and refluxed for 3 hours after the final addition of diketene. It was then cooled and washed with three 100-ml. portions of water. The organic layer was then dried over magnesium sulfate and, after separation of the salt, the solvent was removed under reduced pressure (35–40°/1.0 mm.). The residual oil was taken up in about 300 ml. of methanol and after the solution was cooled to 10° C. a small amount of insoluble material was filtered. The filtrate was then cooled to −20° to −30° C. and the yellow solid which came out of solution was filtered. The product was washed with three 30-ml. portions of cold methanol (−30° C.) and sucked dry on the funnel. It weighed 90.0 g. (78% yield) and had M.P. 41.5–42.5°.

Analysis.—Calculated for $C_{11}H_{11}NO_5$: C, 55.6; H, 4.6; N, 5.9. Found: C, 55.6; H, 4.5; N, 5.6.

(b) p-Nitrobenzyl 2-chloroacetoacetate p-Nitrobenzyl acetoacetate (50.0 g., 0.211 mole) was dissolved in 300 ml. of chloroform. The solution was stirred and, while the temperature was kept at 35–40° C., 28.5 g. (0.211 mole) of sulfuryl chloride was added during the course of one-half hour. The solution was then refluxed for two hours, cooled and then stripped at 50° C. and 0.08 mm. pressure. The dark viscous oil was taken up in 200 ml. of anhydrous ether and refrigerated at −23° overnight. The product, a white solid, was filtered and washed with cold anhydrous ether; M.P. 57–59°, 45.0 g. (79% yield).

Analysis.—Calculated for $C_{11}H_{10}ClNO_5$: Cl, 13.1; N, 5.2. Found: Cl, 13.2; N, 5.2.

(c) 2-(p-nitrobenzyloxycarbonyl)-1-methylvinyl dimethyl phosphate p-Nitrobenzyl 2-chloroacetate (85.0 g., 0.313 mole) was dissolved in 400 ml. of xylene. The solution was stirred and refluxed at 130° C. while trimethyl phosphite (44.0 g., 0.35 mole) was added during the course of one-half hour. After the final addition, the solution was stirred at 130° for one hour. The evolved gases, which had been condensed in a Dry Ice-acetone trap, weighed 16.0 g. (theory for methyl chloride 15.5 g.) The reaction mixture was stripped at 60° C. (15–20 mm.). The residual oil was taken up in 400 ml. of anhydrous ether. 20 ml. of hexane was added and the whole was cooled to −25° C. The precipitate was filtered, taken up in 200 ml. of anhydrous ether and refrigerated at −20° C. overnight. The product separated as tan-colored crystals, 40.0 g. (37% yield), M.P. of 52–54°.

Analysis.—Calculated for $C_{13}H_{16}NO_8P$: P, 9.0; N, 4.1; Cl, 0.0. Found: P, 9.0; N, 4.2; Cl, < 0.1.

EXAMPLE II. — 2 - (m - NITROBENZYLOXYCARBONYL)-1-METHYLVINYL DIMETHYL PHOSPHATE

(a) m-Nitrobenzyl acetoacetate (1) *From diketene.*—m-Nitrobenzyl alcohol (150.0 g., 0.98 mole) and 0.5 g. of p-toluenesulfonic acid were stirred together at 100±5° C. The heating mantle was removed and diketene (82.0 g., 0.98 mole) was added dropwise during the course of one hour. The reaction was exothermic and the temperature was easily maintained at 100±5° C. by varying the rate of addition of diketene. The reaction solution was stirred at 100±5° C. for one-half hour after all of the diketene had been added. The resulting reddish brown oil was then cooled and poured into 3–4 volumes of methanol. The solution was refrigerated overnight and the precipitate which had formed was filtered, washed with cold methanol, and sucked dry. The off-white product weighed 125.0 g. (54% yield) and had M.P. 70.5–72.0°.

Analysis.—Calculated for $C_{11}H_{11}NO_5$: C, 55.6; H, 4.6; N, 5.9. Found: C, 55.0; H, 4.8; N, 5.9.

(2) *By transesterification.*—A mixture of m-nitrobenzyl alcohol (50.0 g., 0.33 mole) and ethyl acetoacetate (100 g., 0.77 mole) was set to reflux in a flask equipped with a small helices-packed column topped with a variable reflux-ratio distilling head. Ethyl alcohol distilled slowly out of the reaction mixture during the course of approximately one hour between kettle temperatures of 157–193° C. and head temperatures of 75–80° C. The colorless distillate measured 19.4 ml., 15.0 g., and had $n_D^{25}$ 1.3610. The ethyl acetoacetate was removed by stripping the reaction mixture down to 122° C. (1.0 mm.). The residual oil was taken up in 200 ml. of methanol and refrigerated overnight. The precipitated product was filtered, washed with cold methanol, and sucked dry on the filter; weight, 68.0 g. (87% yield), M.P. 72–73.5°.

(b) m-Nitrobenzyl-2-chloroacetoacetate m-Nitrobenzyl acetoacetate (100.0 g., 0.42 mole) was dissolved in 300 ml. of chloroform. The well-stirred solution was kept at 35–40° C. while sulfuryl chloride (54.0 g., 0.40 mole) was added during the course of one-half hour. The solution was stirred and refluxed for 2 hours after the sulfuryl chloride had all been added. The reaction mixture was cooled and the solvent was removed by stripping down to 40° C. (15–20 mm.). A final stripping at 100° (0.002 mm.) left the product as a brown viscous oil, 95.0 g. (83% yield).

Analysis.—Calculated for $C_{11}H_{10}ClNO_5$: Cl, 13.1. Found: Cl, 13.0.

(c) 2-nitrobenzyloxycarbonyl)-1-methylvinyl dimethyl phosphate m-Nitrobenzyl 2-chloroacetoacetate (92.0 g., 0.34 mole) was stirred and heated to 75° C. Trimethyl phosphite (46.0 g., 0.37 mole) was added dropwise during the course of one-half hour. The reaction was exothermic but the temperature was kept between 75–80° C. with external cooling by an ice bath. After the addition was complete, the reaction mixture was stirred at 100° C. for one hour. The methyl chloride which evolved was condensed in a Dry Ice-acetone trap; it weighed 17.0 g., (0.34 mole). The residual dark brown oil was stripped at 100° C. (0.002 mm.) and then distilled at 195–200° C. (0.002 mm.). There was obtained 73.0 g. (63% yield) of product as a yellow liquid.

Analysis.—Calculated for $C_{13}H_{16}NO_8P$: P, 9.0; Cl, 0.0. Found: P, 8.4; Cl, 1.2.

This product was purified by stripping at 160° C. (0.001 mm.); 57.0 g. (49% yield), $n_D^{25}$ 1.5258.

Analysis.—Found: P, 9.2; N, 4.1; Cl, 0.5.

EXAMPLE III. — 2 - (o - NITROBENZYLOXYCARBONYL)-1-METHYLVINYL DIMETHYL PHOSPHATE

(a) o-Nitrobenzyl acetoacetate

A mixture of o-nitrobenzyl alcohol (62.0 g., 0.40 mole) and ethyl acetoacetate (110 g., 0.85 mole) was refluxed in a flask equipped with a small helices-packed column topped with a variable reflux-ratio distilling head. Ethyl alcohol distilled slowly out of the reaction mixture during the course of approximately one hour between kettle temperatures of 156–205° C. and head temperatures of 74–82° C. The colorless distillate (19.0 g.) had $n_D^{25}$ 1.3600. Excess ethyl acetoacetate was removed by stripping the reaction mixture down to 100–110° C. (1.0 mm.). The viscous residue was taken up in 300 ml. warm methanol and the solution was charcoaled. The product which separated on cooling was filtered and sucked dry on the filter, M.P. 56–58°, 73.0 g. (77% yield).

Analysis.—Calculated for $C_{11}H_{11}NO_5$: C, 55.6; H, 4.6; N, 5.9. Found: C, 56.6; H, 5.2; N, 5.8.

(b) o-Nitrobenzyl 2-chloroacetoacetate o-Nitrobenzyl acetoacetate (50.0 g., 0.21 mole) was dissolved in 100 ml. of methylene chloride. The temperature was maintained at 15–20° C. while sulfuryl chloride (26.5 g., 0.197 mole) was added during the course of one-half hour. The mixture was stirred and heated at room temperature for one hour after the addition of sulfuryl chloride was completed. The solvent was removed at the water aspirator and the product (57.0 g., 0.21 mole) was obtained by stripping at 50° C. (1.0 mm.) for two hours.

Analysis.—Calculated for $C_{11}H_{10}ClNO_5$: Cl, 13.1. Found: Cl, 12.3.

(c) 2-(o-nitrobenzyloxycarbonyl)-1-methylvinyl dimethyl phosphate o-Nitrobenzyl 2-chloroacetoacetate (57.0 g., 0.21 mole) was dissolved in 100 ml. of benzene and stirred and heated to 50° C. Trimethyl phosphite (28.0 g., 0.23 mole) was added dropwise during the course of one-half hour. The temperature was maintained at 50° C. for 3 hours after the addition of trimethyl phosphite was completed. The solvent was removed at the water aspirator and the residual oil was stripped to 50° C. (1.0 mm.). This oil was stripped again at 135–140° C. (0.001 mm.) and the residue (53.0 g.) was distilled at 170–175° C. (0.001 mm.). The product, a viscous yellow oil, weighed 40.0 g. (55% yield), $n_D^{25}$ 1.5257.

Analysis.—Calculated for $C_{13}H_{16}NO_8P$: P, 9.0; N, 4.1; Cl, 0.0. Found: P, 8.4; N, 4.0; Cl, 0.4.

That the compounds of the present invention possess insecticidal activity and are particularly outstanding in their showing of extended residual toxicity is amply evidenced by the following table wherein compounds of the present invention are compared with Guthion and methyl parathion, both well-known commercial insecticides.

COMPARATIVE RESIDUAL TOXICITY OF NITROBENZYL-SUBSTITUTED VINYL PHOSPHATES

| Compound | Dosage, Lb./Acre | Percent 24-Hour Mortality of Boll Weevils at Days After Treatment | | | Percent 24-Hour Mortality of Houseflies at Days After Treatment | | | | | Percent Reduction of Two-Spotted Spider Mites 7 Days After Treatment at Dosage (g./100 ml.) |
|---|---|---|---|---|---|---|---|---|---|---|
| | | 0 | 1 | 2 | 0 | 1 | 2 | 3 | 7 | |
| 2-(p-Nitrobenzyloxycarbonyl)-1-methyl-vinyl dimethyl phosphate | | | | | 97 | 65 | 81 | 73 | 39 | 100 (0.125). |
| 2-(m-Nitrobenzyloxycarbonyl)-1-methyl-vinyl dimethyl phosphate | 0.5 | 100 | 97 | 57 | 91 | 55 | 57 | 69 | 48 | 100 (0.075). |
| O,O-Dimethyl S-(4-oxobenzotriazin-3-yl-methyl) phosphorodithioate.[1] | 0.5 | 100 | 98 | 44 | | | | | | 100 (0.15). |
| O,O-Dimethyl O-p-nitrophenyl phosphorothioate.[2] | 0.5 | 100 | 22 | | 100 | 100 | 34 | 22 | 1 | 43 (0.5 lb. per acre). |

[1] Guthion.
[2] Methyl parathion.

EXAMPLE IV.—2-(o- AND p-NITROBENZYLOXYCARBONYL) - 1 - METHYLVINYL DIMETHYL PHOSPHATES

Benzyloxycarbonyl-1-methylvinyl dimethyl phosphate (35.0 g., 0.117 mole) was stirred at 10±2°. During the course of one-half hour a mixture containing 17.5 ml. of concentrated sulfuric acid (d., 1.84) and 17.5 ml. of concentrated nitric acid (d., 1.42) was added and stirring was continued for an additional one and one-half hours. The temperature was maintained at 10±2° throughout the run. The reaction was quenched by pouring the mixture onto cracked ice. Methylene chloride was added and the organic layer was separated, washed with water, 5% sodium bicarbonate solution, and finally with water again. The methylene chloride solution was dried over anhydrous magnesium sulfate and after filtration of the salt the filtrate was stripped down to 85–90° (0.001 mm.). The product, a light brown oil, weighed 29.0 g. (72% yield), $n_D^{25}$ 1.5260.

Analysis.—Calculated for $PNO_8C_{13}H_{16}$: P, 9.0; N, 4.1. Found: P, 8.9; N, 4.1; Cl, 0.7.

The infrared spectrum indicates this product to be essentially a mixture of the 2-(o- and p-nitrobenzyloxycarbonyl)-1-methylvinyl dimethyl phosphates. All experiments were conducted under identical conditions. It is clear from this table that 2-(p-nitrobenzyloxycarbonyl)-1-methylvinyl dimethyl phosphate and 2-(m-nitrobenzyloxycarbonyl)-1-methylvinyl dimethyl phosphate are significantly superior to Guthion and methyl parathion. For example, the table shows that 2-(m-nitrobenzyloxycarbonyl)-1-methylvinyl dimethyl phosphate causes a 57% mortality of boll weevils two days after treatment, whereas Guthion brings about only a 44% mortality. 2-(p-nitrobenzyloxycarbonyl)-1-methylvinyl dimethyl phosphate effects a total kill of two-spotted spider mites seven days after treatment at a dosage of 0.125 g. per 100 ml., whereas Guthion required 0.15 g. per 100 ml. Hence, it is clear that the compounds of the present invention show significant residual toxicity when compared to compounds commonly employed as insecticides. The toxicity of the compounds of the present invention against the common housefly (Musca domestica) was determined generally following the method described by Y. P. Sun, Journal of Economic Entomology, Volume 43, page 45 et seq. (1950). Solutions or emulsions of representative compounds were made up by employing acetone, a neutral petroleum distillate lying within the kerosene range as a solvent. These solutions were tested for toxicity against insects listed in the table by spraying groups of plants infested with the insects under controlled conditions which varied from test to test only in the concentration of toxicant.

The test against boll weevils was conducted by spraying the listed compounds at the rate of 0.5 lb. per acre on boll weevils caged on field treated cotton plants. Against the two-spotted spider mite, preinfested bean plants were treated with low volume sprays of the test chemical. Seven days after spraying total living mites were counted and the percent reduction of the mites tabulated.

The compounds of this invention can be employed for insecticidal purposes by the use of any of the methods which are conventionally employed in the art. For example, the compounds can either be sprayed or otherwise applied in the form of a solution or dispersion, or they can be absorbed on an inert, finely divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, $C_{12}$ to $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insecticide species to be controlled, a proper consideration and resolution of these factors being within the skill of those versed in the insecticide art. In general, however, the compounds of this invention are effective in concentrations of from about 0.01 to 0.5% based upon the total weight of the composition, though under some circumstances as little as about 0.00001% or as much as 2% or even more of the compound can be employed with good results from an insecticidal standpoint.

When employed as an insecticide, a compound of this invention can be employed either as the sole toxic ingredient or the insecticidal composition, or it can be employed in conjunction with the other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, azobenzene, and the various compounds of arsenic lead and/or fluorine.

We claim as our invention:

1. A compound of the general formula

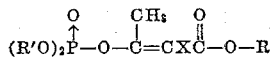

wherein R is selected from the group consisting of a nitro-substituted mononuclear aryl radical and a nitro aralkyl radical, wherein the aromatic moiety is mononuclear and the alkyl moiety contains from 1 to 5 carbon atoms, R' is selected from the group consisting of an alkyl radical containing from 1 to 5 carbon atoms, a monocyclic aryl radical and an aralkyl radical wherein the aryl moiety is mononuclear and the alkyl moiety contains from 1 to 5 carbon atoms, and X is selected from the group consisting of hydrogen, bromine and chlorine.

2. A compound of the general formula

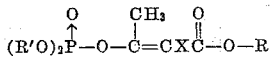

wherein R is selected from the group consisting of a nitro-substituted mononuclear aryl radical and a nitro aralkyl radical wherein the aromatic moiety is mononuclear and the alkyl moiety contains from 1 to 5 carbon atoms, R' is an alkyl radical containing from 1 to 5 carbon atoms, and X is selected from the group consisting of hydrogen, bromine and chlorine.

3. A compound of the general formula

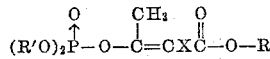

wherein R is selected from the group consisting of a nitro-substituted mononuclear aryl radical and a nitro aralkyl radical wherein the aromatic moiety is mononuclear and the alkyl moiety contains from 1 to 5 carbon atoms, R' is a mononuclear aryl radical, and X is selected from the group consisting of hydrogen, bromine and chlorine.

4. 2-(nitroaryloxycarbonyl)-1-methylvinyl dialkyl phosphate wherein the aryl moiety of the nitroaryl group is mononuclear and each alkyl group contains from 1 to 5 carbon atoms.

5. 2-(nitroaralkyloxycarbonyl)-1-methylvinyl dialkyl phosphate wherein the aryl moiety of the nitroaralkyl group is mononuclear and the alkyl moiety thereof, and each of the alkyl groups, contains from 1 to 5 carbon atoms.

6. 2-(p-nitrobenzyloxycarbonyl)-1-methylvinyl dimethyl phosphate.

7. 2-(m-nitrobenzyloxycarbonyl)-1-methylvinyl dimethyl phosphate.

8. 2-(o-nitrobenzyloxycarbonyl)-1-methylvinyl dimethyl phosphate.

9. A method of combating insects which comprises applying to insect habitats a compound of claim 2.

10. A method of combating insects which comprises applying to insect habitats a compound of claim 4.

11. A method of combating insects which comprises applying to insect habitats a compound of claim 5.

12. A method of combating insects which comprises applying to insect habitats the compound of claim 6.

13. A method of combating insects which comprises applying to insect habitats the compound of claim 7.

14. A method of combating insects which comprises applying to insect habitats the compound of claim 8.

15. As an insecticidal composition of matter a compound of claim 1 supported upon a finely divided inert carrier material, the concentration of said compound being from about 0.00001 to about 2 percent of the combined weights of said compound and said carrier material.

16. As an insecticidal composition of matter a compound of claim 1 disseminated in an inert horticultural carrier liquid, the concentration of said compound being from about 0.00001 to about 2 percent of the combined weights of said compound and said carrier material.

References Cited in the file of this patent
UNITED STATES PATENTS

| | | |
|---|---|---|
| 2,739,978 | Gamrath | Mar. 27, 1956 |
| 2,754,316 | Conly | July 10, 1956 |
| 2,769,743 | Mattson | Nov. 6, 1956 |
| 2,828,241 | Birum | Mar. 25, 1958 |